United States Patent
Moradi-Araghi et al.

(10) Patent No.: US 8,691,736 B2
(45) Date of Patent: Apr. 8, 2014

(54) SWELLABLE POLYMER WITH CATIONIC SITES

(75) Inventors: Ahmad Moradi-Araghi, Bixby, OK (US); James H. Hedges, Bartlesville, OK (US); David R. Zornes, Bartlesville, OK (US); Riley B. Needham, Bartesville, OK (US); Huili Guan, Lawrence, KS (US); Jenn-Tai Liang, Lawrence, KS (US); Cory Berkland, Lawrence, KS (US); James P. Johnson, Houston, TX (US); Min Cheng, Bartlesville, OK (US); Faye L. Scully, Bartlesville, OK (US)

(73) Assignees: ConocoPhillips Company, Houston, TX (US); University of Kansas, Lawrence, KS (US)

( * ) Notice: Subject to any disclaimer, the term of this patent is extended or adjusted under 35 U.S.C. 154(b) by 605 days.

(21) Appl. No.: 12/815,314

(22) Filed: Jun. 14, 2010

(65) Prior Publication Data
US 2010/0314115 A1 Dec. 16, 2010

Related U.S. Application Data

(60) Provisional application No. 61/186,957, filed on Jun. 15, 2009.

(51) Int. Cl.
*C08J 9/16* (2006.01)
*E21B 43/16* (2006.01)

(52) U.S. Cl.
USPC ........... 507/223; 507/219; 507/222; 507/224; 507/225; 507/229; 507/230; 507/231; 507/240; 507/241; 507/242; 507/244; 507/245; 507/248; 166/305.1; 521/56

(58) Field of Classification Search
None
See application file for complete search history.

(56) References Cited

U.S. PATENT DOCUMENTS

| | | | | |
|---|---|---|---|---|
| 3,251,194 A | * | 5/1966 | Walker | 62/66 |
| 3,480,546 A | * | 11/1969 | Bashaw et al. | 169/47 |
| 3,727,688 A | | 4/1973 | Clampitt | |
| 3,749,172 A | | 7/1973 | Hessert et al. | |
| 3,798,836 A | * | 3/1974 | Rubens et al. | 47/63 |
| 4,068,714 A | | 1/1978 | Hessert et al. | |
| 4,409,110 A | | 10/1983 | Borchardt et al. | |
| 4,683,949 A | | 8/1987 | Sydansk et al. | |
| 5,171,808 A | | 12/1992 | Ryles et al. | |
| 5,973,042 A | * | 10/1999 | Yoshinaga et al. | 524/192 |
| 6,454,003 B1 | | 9/2002 | Chang et al. | |
| 6,729,402 B2 | | 5/2004 | Chang et al. | |
| 6,984,705 B2 | | 1/2006 | Chang et al. | |
| 7,300,973 B2 | | 11/2007 | Chang et al. | |
| 2003/0149212 A1 | | 8/2003 | Chang et al. | |
| 2005/0031884 A1 | | 2/2005 | Koide et al. | |
| 2007/0204989 A1 | | 9/2007 | Tang et al. | |
| 2008/0075667 A1 | | 3/2008 | Berkland et al. | |

FOREIGN PATENT DOCUMENTS

EP 1734011 12/2006
WO PCT/US2010/038528 11/2010

OTHER PUBLICATIONS

Youjun Deng, et al., Adsorption of Polyacrylamide on Smectite, Illite, and Kaolinite, Soil Sci Soc Am J 70:297-304 (2006).
Yuping Wei and Fa Cheng, Synthesis and aggregates of cellulose-based hydrophobically associating polymer, Carbohydrate Polymers 68(4):734-739 (2007).
U.S. Appl. No. 12/722,344, filed Mar. 11, 2010, Moradi-Araghi et al.
U.S. Appl. No. 12/780,792, filed May 14, 2010, Moradi-Araghi et al.
U.S. Appl. No. 12/797,402, filed Jun. 9, 2010, Moradi-Araghi et al.
U.S. Appl. No. 12/815,314, filed Jun. 14, 2010, Moradi-Araghi et al.
SPE 89413 (2004); Larry Eoff, Presentation at the 2004 SPE/DOE Fourteenth Symposium on Improved Oil Recovery held in Tulsa, Oklahoma, USA Apr. 17-21, 2004 SPE 89413 (2004).
SPE 113264 (2008); F. Aktas, Presentation at 2008 SPE/DOE Symposium on Improved Oil Recovery held in Tulsa, USA, Apr. 19-23, 2008.
SPE 99441 (2008); Dongmei Wang, Presentation at the 2006/SPE/DOE Symposium on Improved Oil Recovery, Tulsa, Apr. 22-26.
SPE 29008 (1995); K.C. Taylor, Presentation at the SPE International Symposium on Oilfield Chemistry held in San Antonio, Tx, USA Feb. 14-17, 1995.

* cited by examiner

*Primary Examiner* — John J Figueroa
(74) *Attorney, Agent, or Firm* — Boulware & Valoir

(57) ABSTRACT

The invention is directed to long lasting crosslinked water-soluble swellable polymers, methods for making same, and their uses. More particularly, the invention relates to a composition comprising expandable polymeric particles having cationic sites as well as labile crosslinkers and stable crosslinkers, said particle mixed with a fluid. A particularly important use is as an injection fluid in petroleum production, where the expandable polymeric particles are injected into a target zones in the reservoirs and when the heat and/or a suitable pH in the reservoir cause degradation of the labile crosslinker and when the particle expands, the cationic sites in the polymer adsorb to negative sites of the rock in the formation, thus diverting water to lower permeability regions and improving oil recovery. However, many other uses are possible.

21 Claims, No Drawings

SWELLABLE POLYMER WITH CATIONIC SITES

CROSS-REFERENCE TO RELATED APPLICATIONS

This application claims priority to U.S. Provisional Application No. 61/186,957, filed Jun. 15, 2009, which is incorporated herein by reference in its entirety.

FEDERALLY SPONSORED RESEARCH STATEMENT

Not applicable.

REFERENCE TO MICROFICHE APPENDIX

Not applicable.

FIELD OF THE INVENTION

The invention relates to crosslinked swellable polymers containing cationic sites and stable and labile crosslinkers. Once the cationic sites are exposed on decay of the labile crosslinkers, the polymer will swell and will adsorb to negatively charged surfaces such as sandstone rock. A particularly important use is as fluid diversion agents for sweep improvement in enhanced oil recovery applications and also as drilling fluids in petroleum production, but applications can also include uses in the hygiene and medical arts, packaging, agriculture, the cable industry, information technology, in the food industry, papermaking, use as flocculation aids, and the like.

BACKGROUND OF THE INVENTION

The water injection method used in oil recovery is where water is injected out into the reservoir, usually to increase pressure and thereby stimulate production. Water is injected for two reasons: 1. For pressure support of the reservoir (also known as voidage replacement). 2. To sweep or displace the oil from the reservoir, and push it towards an oil production well. Normally only 20% of the oil in a reservoir can be extracted, but water injection increases that percentage (known as the recovery factor) and maintains the production rate of a reservoir over a longer period of time.

However, sweep recovery is limited by the so-called "thief zones," whereby water preferentially travels through the more porous regions of the reservoirs, bypassing less permeable zones, leaving unswept oil behind. One means of further improving recovery is to partially block thief zones with a polymer or other material, thus forcing water through the less permeable regions.

U.S. Pat. No. 6,454,003, U.S. Pat. No. 6,984,705 and U.S. Pat. No. 7,300,973 describe an expandable crosslinked polymeric particle having an average particle diameter of about 0.05 to 10 microns (nano- to microparticle sizes). The particle is highly crosslinked with two crosslinkers, one that is stable and a second that is labile. The excess crosslinking makes the initial particles quite small, allowing efficient propagation through the pores of a reservoir. On heating to reservoir temperature and/or at a predetermined pH or other stimuli, the reversible (labile) internal crosslinks break, allowing the particle to further expand by absorbing additional injection fluid, usually water. The initial polymer is sometimes called the "kernel" before its expansion, in analogy to the way a kernel of popcorn "pops" in response to certain stimuli, such as heat.

The unique properties of this particle render it a water-like viscosity at concentrations as high as 1.0% requiring very little horsepower for injection into the porous media and avoid shearing encountered for standard polymers. The small particles suspended in water follow the high permeability zones—commonly called thief zones or streaks—and then be expanded in situ so that the swollen particle blocks the thief zones and subsequent injections of fluid are forced to enter the remainder of the reservoir, more effectively sweeping the reservoir. However, the method is limited in practice because subsequent water injections always remove some of the polymer. Hence the thief zones become washed out and again present the problem of allowing the injection fluid to avoid the less permeable zones.

The reason for the washout is not certain, but our own research suggests that the swollen polymer is not in gel form, thus although viscous, is still a liquid that can be washed out of the porous substrate.

What is needed in the art is a long lasting polymer that is less susceptible to loss under the conditions of use. In particular, a swellable polymer that partially adsorbs on the rock surface and is resistant to washout by subsequent fluid injections, is needed.

SUMMARY OF THE INVENTION

The invention generally relates to polymers that have stable and labile crosslinkers, allowing swelling in situ in response to a particular stimulus. Further, the polymers contain cationic sites that become accessible on swelling of the polymer and that act to adsorb to the surrounding negatively charged surfaces, including, for example, the various negatively charged minerals in a reservoir.

Preferably, the polymers of the invention comprise highly crosslinked expandable polymeric particles having labile crosslinkers and stable crosslinkers, wherein at least one of the monomers that makes up the polymer or copolymer contains cationic sites. To be useful in a reservoir application, the polymer must contain sufficient cationic sites so as to allow sorption to rock, thus preventing washout. In preferred embodiments, the cationic sites must be at least 0.5 mole percent, or preferably 1, 2, 3, 4, 5, 7.5 or 10 mole percent or even more. The cationic site of choice will vary with pH and the mineral constituents in the reservoir formation, and will also vary with different applications.

The polymer of the invention has particular use in oil recovery, as described above, and is preferably a hydrophilic polymer for this application. However, an adsorbed polymer would find uses in all of the arts where swellable polymers are in current use and polymer loss or washout is not desired, including as filler for diapers and other hygiene products, medical devices such as orthopedic insoles, ocular devices, and biomimetic implants, wipe and spill control agents, wire and cable water-blocking agents, ice shipping packs, controlled drug release, agricultural uses (e.g., soil additive to conserve water, plant root coating to increase water availability, and seed coating to increase germination rates), industrial thickeners, specialty packaging, tack reduction for natural rubber, fine coal dewatering, and the like.

By "polymer" what is meant herein is a polymerized monomer, including mixtures of two or more different monomers.

A "stable crosslinker" is defined herein to be any crosslinker that is not degraded under the stimulus that causes the labile crosslinker to disintegrate. Representative non-labile crosslinkers include methylene bisacrylamide, diallylamine, triallylamine, divinyl sulfone, diethyleneglycol diallyl ether, and the like and combinations thereof. A preferred non-labile crosslinker is methylene bisacrylamide.

The "labile crosslinker" is defined herein to be any crosslinker that decays or is reversible on application of a particular stimulus, such as irradiation, suitable pH and temperature, etc. and combinations thereof. Representative labile crosslinkers include acrylate or methacrylate esters of di, tri, tetra hydroxy compounds including ethyleneglycol diacrylate, polyethyleneglycol diacrylate, trimethylopropane trimethacrylate, ethoxylated trimethylol triacrylate, ethoxylated pentaerythritol tetracrylate, and the like; divinyl or diallyl compounds separated by an azo such as the vinyl or allyl esters of di or tri functional acids, and combinations thereof. Preferred labile crosslinkers include water soluble diacrylates such as polyethylene glycol diacrylates (PEG 200-1000 diacrylate, preferably PEG 200 diacrylate and PEG 400 diacrylate), and polyfunctional vinyl derivatives of a polyalcohol such as ethoxylated (9-20) trimethylol triacrylate and polymethyleneglycol diacrylate.

US2008075667, herein incorporated by reference, describes additional acid labile ketal cross linkers that can be used in the invention. Such acid labile ketal crosslinkers can have one of the following formulas:

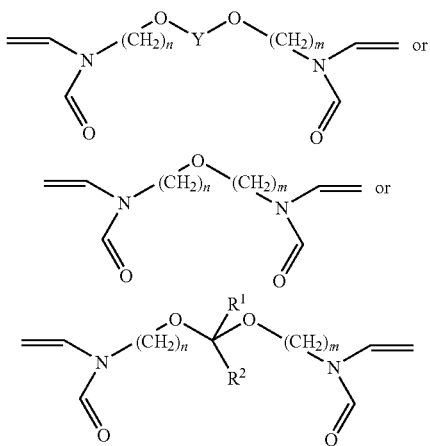

wherein n and m are independently an integer of between 1 and 10 and wherein $R^1$ and $R^2$ are independently a lower alkyl and wherein Y is a lower alkyl. In particular, 2-bis[2,2'-di(N-vinylformamido)ethoxy]propane (BDEP) and 2-(N-vinylformamido)ethyl ether (NVFEE) are described and may be suitable in acidic environments, or where the acid is later added thereto. Such cross linkers can be advantageously combined with the monomers described therein, such as N-vinyl pyrollidone, N-vinyl formamide, N-vinylacetamide, N-vinylacetamine, or any other vinyl based polymers and copolymers thereof, and may be preferred where the neurotoxic effects of acrylamide are to be avoided.

By "adsorb" what is meant is that the polymer binds to negatively charged surfaces, however, some amount of absorption is not intended to be excluded thereby.

The proportion of stable to labile crosslinker can also vary depending on how much swelling on stimulus is required, but in the enhanced oil recovery applications a great deal of swelling is desired to effectively block the thief zones and increase the mobilization and/or recovery rate of hydrocarbon fluids present in the formations. Thus, the concentration of labile crosslinker greatly exceeds the concentration of stable crosslinker. To obtain sizes in the range of about 0.05 to about 10 microns suitable for injection fluid use the crosslinker content is about 1,000-200,000 ppm of labile crosslinker and from >0 to 300 ppm of non-labile crosslinkers.

Combinations of multiple stable and labile crosslinkers can also be employed advantageously. Reaction to stimuli can also be controlled by labile crosslinker selection, as needed for particular reservoir conditions or for the application at issue. For example, judicious selection of labile crosslinkers—one that degrades at a very high temperature and another at a lower temperature—can affect the temperature and pH at which the kernel pops. Furthermore, labile crosslinker concentration can be manipulated to obtain popping at a desired time and temperature.

Other crosslinkers include, but are not limited to, diacrylyl tertiary amides, diacrylylpiperazine, DATD (diallyltartardiamide), DHEBA (dihydroxyethylene-bis-acrylamide), and BAC (bis-acrylylcystamine), trimethylolpropane trimethacrylate (TMPTMA), propyleneglycol triacrylate (PGTA), tripropyleneglycol diacrylate (TPGDA), allyl methacrylate (AMA), triethyleneglycol dimethacrylate (TEGDMA), tetrahydrofurfuryl methacrylate (TFMA) and trimethylolpropane triacrylate (TMPTA). Multifunctional crosslinkers include, but are not limited to, pentaerythritol triacrylate, 1,5 pentane diol dimethacrylate, and pentaerythritol triallylether.

By "cationic site" what is meant is a site in the polymer that is net positively charged under the conditions of use. The polymer can be made with cationic monomers, and this is preferred for downhole applications, as this ensures that cationic sites are well dispersed throughout the particle and chemical modifications inside the reservoir may be difficult. However, in applications where access is unrestricted, the polymer may be treated after synthesis to convert the polymer to a cationic polymer. For example, the cationic polyacrylamide can be a Mannich modification product of polyacrylamide, a Hofmann degradation product of polyacrylamide, a reaction product between partially hydrolyzed polyacrylamide and polyethyleneimine, and the like.

Cationic polymers are typically used as flocculants or to bind to and separate various minerals. Therefore, much is known in the art about the selection of the appropriate cations for adsorption to particular minerals. See e.g., Youjun Deng, et al., Adsorption of Polyacrylamide on Smectite, Illite, and Kaolinite, Soil Sci Soc Am J 70:297-304 (2006).

Preferred cationic sites include quaternary ammonium sites, such as those found in diallyldimethylammonium chloride (DADMAC), (3-(methacryloylamino) propyl) trimethyl ammonium chloride (MAPTAC), (2-(methacryloyloxy) ethyl) trimethyl ammonium chloride (MATMAC), and vinylbenzyl trimethyl ammonium chloride (VBTMAC).

In another embodiment, the cationic polymers are selected from the group consisting of DMAEA/MCQ (dimethylaminoethylacrylate methyl chloride quaternary salt), DMAEA/BCQ (dimethylaminoethylacrylate benzyl chloride quaternary salt), and DMAEM/MCQ (dimethylaminoethylmethacrylate methyl chloride quaternary salt). Many other representative cationic monomers are described throughout the patent literature, e.g., EP1734011, which is incorporated by reference herein.

The solvent of the system is an aqueous liquid, such as deionized water, potable water, fresh water, or brine having a total dissolved solids concentration up to the solubility limit of the solids in water. Inert fillers known in the art may also be added to the system if desired or for use as proppants. Such fillers include crushed or naturally fine rock material or glass beads, sand and the like.

Representative nonionic monomers include acrylamide, N-isopropylacrylamide, N,N-dimethylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), maleic anhydride, N-vinyl pyrrolidone, vinyl acetate and N-vinyl formamide. Preferred nonionic monomers include acrylamide, N-methylacrylamide, N,N-dimethylacrylamide and methacrylamide. N-vinyl formamide, N-vinylacetamide, N-vinylacetamine and copolymers may be preferred with the acid labile ketal crosslinkers of US2008075667.

Anionic or betaine monomers can be combined with the polymers of the invention, but their use is not preferred as they would compete for binding to the cationic sites. However, small amounts may be acceptable provided the cationic sites predominate.

The particles can be prepared by methods known in the art, including the inverse emulsion polymerization technique described in U.S. Pat. No. 6,454,003, U.S. Pat. No. 6,729,402 and U.S. Pat. No. 6,984,705. Particle suspensions are prepared by mixing the particles and injection fluid or by mixing particles in an inverse suspension with a surfactant/and or shearing and additional injection fluid if needed.

In addition to the polymers having cationic sites and fluid, the aqueous solution may also contain other conventional additives including chelating agents to remove polymerization inhibitors, pH adjusters, initiators and other conventional additives, accelerators, retardants, surfactants, stabilizers, etc., as appropriate for the particular application.

In one embodiment, the invention is a composition comprising a fluid, and expandable polymeric particles having at least 0.5 mole percent cationic sites and both labile and stable crosslinkers. In another embodiment, the invention is a composition comprising expandable polymeric particles having cationic sites and both labile and stable crosslinkers, said particle combined with a fluid that allows the polymer to swell, exposing the cationic sites, and allowing the swelled polymer to adsorb to the negatively charged minerals in the reservoir and be resistant to washout.

In another embodiment, the invention is a composition comprising highly crosslinked expandable polymeric particles having at least 0.5 mole percent cationic sites, an unexpanded volume average particle size diameter of from about 0.05 to about 10 microns and a crosslinking agent content of from about 1,000 to about 200,000 ppm of labile crosslinkers and from 0 to about 300 ppm of stable crosslinkers.

In another embodiment, the invention is a method of increasing the recovery of hydrocarbon fluids in a subterranean formation comprising injecting into the subterranean formation a composition comprising a fluid, and a highly crosslinked expandable polymeric particle having at least 0.5 mol percent cationic sites, wherein polymeric particle has an unexpanded volume average particle size diameter of 0.05-10 microns and a crosslinker content of about 1,000-200,000 ppm of labile crosslinker and about >0 to 300 ppm of stable crosslinker, said polymeric particle has a smaller diameter than the pore throats of the subterranean formation, and said labile crosslinkers break under the conditions of temperature and a suitable pH in the subterranean formation to allow the polymeric particle to expand, thus exposing the cationic sites so that said particle can adsorb to the negatively charged minerals in the formation.

In preferred embodiments, the polymeric particles are made with at least 0.5 mole percent cationic monomer, the stable crosslinker can be methylene bisacrylamide, and the labile crosslinker can be a polyethylene glycol diacrylate or 2-bis[2,2'-di(N-vinylformamido)ethoxy]propane (BDEP) and 2-(N-vinylformamido)ethyl ether (NVFEE).

DESCRIPTION OF EMBODIMENTS OF THE INVENTION

The invention provides a novel polymer containing cationic sites that swells on stimulus and is then adsorbed to the surrounding surfaces via the cationic sites. Such polymers have particular utility in sweeping reservoirs, but many uses are possible.

Example 1

Prior Art

We ran a number of slim tube tests in which we injected about 1 pore volume of BRIGHTWATER® (NALCO™, copolymer of acrylamide and sodium AMPS crosslinked with methylene bis-acrylamide and PEG diacrylate) micro-particles into 40 inch slim tubes packed with sand. The sand pack was then heated (150-190° F.) to allow the polymer to pop. Afterwards, water was injected into the sand packs and the resistance to the flow of water measured. While the popped polymers initially exhibited good resistance factors, this behavior appeared to washout with additional water injection. Typically within one pore volume of water injection the Residual Resistance Factor (RRF) dropped to a number about 1-2. This behavior was observed with slim tubes which were packed with 6.7 Darcy sand as well as 1 Darcy sand. Therefore, the treatment effect in porous media with these microparticles was only temporary.

Example 2

Invention

Since the prior art polymer is subject to washout, we propose that when combined with sufficient cationic sites, such as —NH3+ (quaternary ammonium salt monomers), the resulting polymer will remain stable to washout because the polymer will strongly adsorb to the negatively charged minerals in the formation. We intend to prepare a polyacrylamide copolymer having 0.5%, 1%, 2%, 5% and 10% of a cationic monomer, and repeat the experiments above. We predict that a sand pack treated with polymers having cationic sites will exhibit reduced flow.

In summary, polymers that can be adsorbed to media having negative charges can be made by the inclusion of at least 0.5 mol percent cationic sites to a particle having been over-crosslinked with methylene bisacrylamide and PEG diacrylates.

The following references are incorporated by reference herein in their entirety:
U.S. Pat. No. 6,454,003, U.S. Pat. No. 6,729,402 and U.S. Pat. No. 6,984,705
US2008075667
U.S. Pat. No. 3,727,688
U.S. Pat. No. 4,068,714
U.S. Pat. No. 3,749,172
U.S. Pat. No. 4,683,949
EP1734011
Youjun Deng, et al., Adsorption of Polyacrylamide on Smectite, Illite, and Kaolinite, Soil Sci Soc Am J 70:297-304 (2006).

What is claimed is:

1. A composition comprising expandable polymeric particles containing charged monomers having at least 0.5 mole percent cationic sites and being internally crosslinked with both labile crosslinkers and stable crosslinkers, said particles combined with a fluid, wherein said charged monomers have predominately cationic sites.

2. The composition of claim 1, wherein the polymeric particles are hydrophilic and the fluid comprises water.

3. The composition of claim 1, wherein the polymeric particles are made with a cationic acrylamide monomer and at least one nonionic monomer selected from a group containing acrylamide, N-vinyl pyrollidone, N-vinyl formamide, N-vinylacetamide, N-vinylacetamine or a vinyl containing monomer.

4. The composition of claim 1, wherein the cationic site are made by Mannich modification, Hofmann degradation or hydrolysis.

5. The composition of claim 1, wherein the expandable polymeric particles comprise a copolymer of cationic acrylamide monomer and at least one other monomer.

6. The composition of claim 1, wherein the cationic sites are provided by at least one cationic monomer selected from the group consisting of diallyldimethylammonium chloride, (3-(methacryloylamino)propyl)trimethyl ammonium chloride, (2-(methacryloyloxy)ethyl)trimethyl ammonium chloride, vinylbenzyl trimethyl ammonium chloride, dimethylaminoethylacrylate methyl chloride quaternary salt, dimethylaminoethylacrylate benzyl chloride quaternary salt, and dimethylaminoethylmethacrylate methyl chloride quaternary salt.

7. The composition of claim 1, wherein the stable crosslinker is methylene bisacrylamide and the labile crosslinker is a diacrylate.

8. The composition of claim 1, wherein the expandable polymeric particles comprise a copolymer of a cationic monomer and an acrylamide monomer, the stable crosslinker comprises methylene bisacrylamide, and the labile crosslinker comprises a polyethylene glycol diacrylate.

9. The composition of claim 1, wherein the expandable polymeric particles comprise a copolymer of a cationic monomer and an acrylamide monomer, the stable crosslinker comprises methylene bisacrylamide, the labile crosslinker comprises a polyethylene glycol diacrylate and the fluid comprises water.

10. The composition of claim 1, wherein the labile crosslinker is an acid labile ketal of the formula:

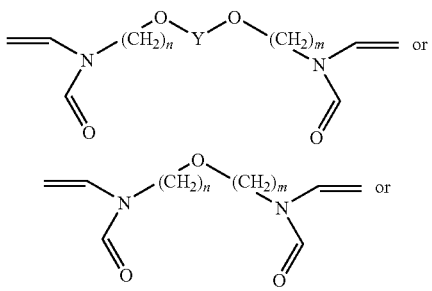

-continued

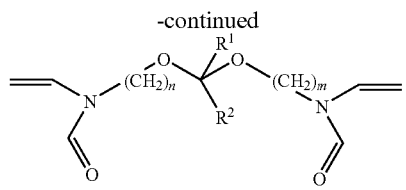

wherein Y is a lower alkyl,
wherein n and m are independently an integer of between 1 and 10, and
wherein $R^1$ and $R^2$ are independently a lower alkyl.

11. The composition of claim 1, wherein the labile crosslinker is 2-bis[2,2'-di(N-vinylformamido)ethoxy]propane.

12. A composition comprising highly crosslinked expandable hydrophilic polymeric particles with predominately cationic sites having at least 0.5 mole percent cationic sites and an unexpanded volume average particle size diameter of from about 0.05 to about 10 microns and an internal crosslinking agent content of from about 1,000 to about 200,000 ppm of labile crosslinkers and from >0 to about 300 ppm of stable crosslinkers, and a fluid comprising water.

13. The composition of claim 12 wherein expandable polymeric particles are made with a cationic acrylamide monomer.

14. The composition of claim 12, wherein the stable crosslinker is methylene bisacrylamide and the labile crosslinker is a diacrylate, or a polyethylene glycol diacryate or an acid labile ketal or 2-bis[2,2'-di(N-vinylformamido)ethoxy]propane or combinations thereof.

15. The composition of claim 12, wherein the expandable polymeric particles comprise a copolymer of a cationic monomer and an acrylamide monomer, the stable crosslinker comprises methylene bisacrylamide, and the labile crosslinker comprises a polyethylene glycol diacrylate.

16. An expandable polymeric particle, comprising a polymer with predominately cationic sites made with at least 0.5 mole percent cationic acrylamide monomer and having an unexpanded volume average particle size diameter of from about 0.05 to about 10 microns and an internal crosslinking agent content of from about 1,000 to about 200,000 ppm of labile crosslinkers and from >0 to about 300 ppm of stable crosslinkers.

17. The expandable polymeric particle of claim 16, made with at least 1 mole percent cationic acrylamide monomer.

18. The expandable polymeric particle of claim 16, made with at least 2 mole percent cationic acrylamide monomer.

19. The expandable polymeric particle of claim 16, made with at least 5 mole percent cationic acrylamide monomer.

20. The expandable polymeric particle of claim 16, made with at least 10 mole percent cationic acrylamide monomer.

21. A composition comprising expandable polymeric particles with predominately cationic sites having at least 0.5 mole percent cationic sites and being internally crosslinked with both labile crosslinkers and stable crosslinkers, said particles combined with a fluid, wherein the labile crosslinker is 2-bis[2,2'-di(N-vinylformamido)ethoxy]propane.

* * * * *